United States Patent

[11] 3,593,633

| [72] | Inventors | Jun Shimomura; Tomio Tsuruoka, both of Tokyo, Japan |
|---|---|---|
| [21] | Appl. No. | 745,849 |
| [22] | Filed | July 18, 1968 |
| [45] | Patented | July 20, 1971 |
| [73] | Assignee | Nippon Kogaku K. K. Tokyo, Japan |
| [32] | Priority | July 31, 1967 |
| [33] | | Japan |
| [31] | | 42/48846 |

[54] STROBO-FLASH PHOTOGRAPHING DEVICE
9 Claims, 12 Drawing Figs.

[52] U.S. Cl. .................................................. 95/11.5
[51] Int. Cl. ................................................ G03b 9/70
[50] Field of Search ................................. 95/11.5, 57

[56] References Cited
UNITED STATES PATENTS

| 2,728,279 | 12/1955 | Gebele | 95/11.5 |
| 2,956,490 | 10/1960 | Staudt | 95/11.5 |
| 3,162,109 | 12/1964 | Singer et al. | 95/11.5 |
| 3,228,314 | 1/1966 | Koppen | 95/11.5 |

Primary Examiner—Samuel S. Matthews
Assistant Examiner—Fred L. Braun
Attorney—Anton J. Wille ABSTRACT: An electronic flash photographing device for a camera having a focal plane shutter and interchangeable objective lenses each having a lens shutter. A signal member on the camera body transmits a signal to the lens shutter, upon completion of the opening operation of the first curtain of the focal plane shutter. The lens shutter is in the closed position immediately before receiving the signal from the signal member and opens in response to the signal resulting in closure of the X contacts to energize the electronic flash. The lens shutter and the second curtain of the focal plane shutter are arranged to close after the flash.

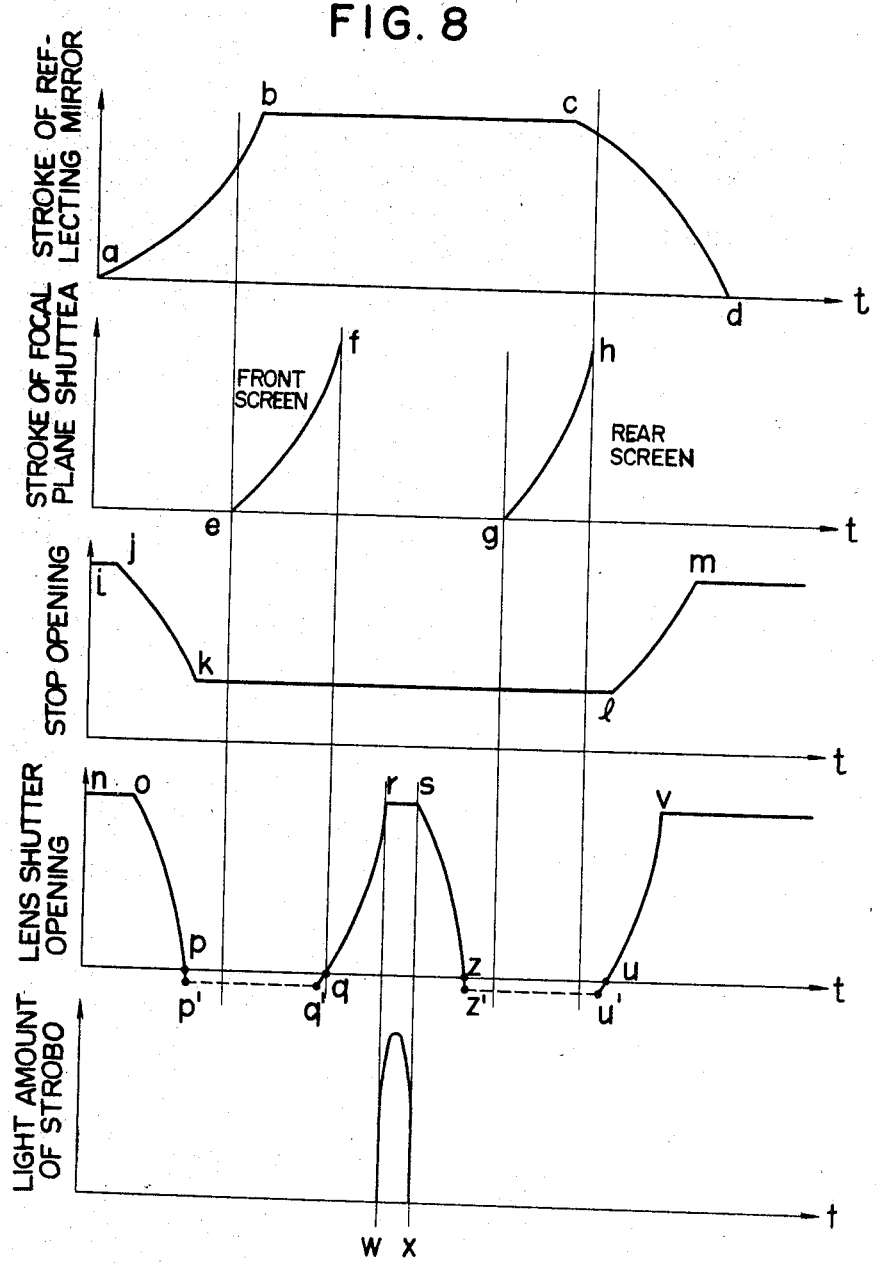

STROBO-FLASH PHOTOGRAPHING DEVICE

This invention relates to a strobo-flash photographing device in a camera having focal plane shutter wherein the interchangeable lens having shutter can be attached.

Strobo-flash almost momentarily flashes and the flash retaining time is remarkably short, and therefore when stroboflash photographing is carried out, light cannot cover the whole field unless strobo-flash photographing should be carried out when the focal plane shutter is totally opened. On the other hand, in the focal plane shutter, the shutter time while the shutter screen is totally opened, is only the shutter time of limited low speed and therefore the shutter time in which X contact is used, is limited.

In various kinds of cameras having the conventional focal plane shutters, when strobo-flash photographing is carried out, the shutter time in which X contact can be used, is limited, and at the same time the shutter time of high speed cannot be used.

An object of this invention is to solve the drawbacks of the conventional strobo-flash photographing, and to make it possible to carry out the strobo-flash photographing by using high speed shutter time in the camera having focal plane shutter.

The fundamental characteristics of the structure of this invention resides in that a signal member for transmitting the timing of a front screen opening completion of the focal place shutter to the lens shutter, is provided on the camera body by interlocking said signal member to the front screen, the lens shutter is fitted to the shutter signal member when the interchangeable lens is mounted on the body, the lens shutter having been closed right before receiving the signal of the shutter signal member is opened by receiving the signal to the result that X contact is closed to carry out strobo-flash photographing, and the lens shutter is closed after the exposure by means of strobo-flash, and the rear screen of the focal plane shutter is closed by closing the lens shutter.

Moreover, in accordance with this invention, a strobo-flash photographing device in a camera having focal plane shutter which can be mounted with the interchangeable lens having a shutter, comprises providing the shutter signal member for transmitting the timing of the front screen opening completion of the focal plane shutter to the lens shutter on the camera body by interlocking the same to the front screen, providing the shutter time regulating signal member for adjusting the shutter time of the focal plane shutter on the interchangeable lens, interlocking the shutter time regulating signal member to the means for adjusting the shutter time of the focal plane shutter when the interchangeable lens is mounted on the body, fitting the shutter signal member on the side of the camera body to the lens shutter to the effect that the shutter time adjusting mechanism can be controlled automatically so that the shutter time for totally opening the focal plane shutter can be attained; providing the signal member interlocked to the flash contact on the side of the camera on the interchangeable lens to the result that when the interchangeable lens is mounted on the camera body, the signal member can be fitted to the member interlocked to the flash contact on the side of the camera, fitting the shutter signal member on the side of the camera body to the lens shutter to the result that the contact which is closed when the total opening of the lens shutter provided on the side of the lens is completed, can form the flash circuit automatically in place of the contact which is closed when the total opening of the front screen on the side of the camera body is completed; providing on the camera side, the delay means for delaying the timing for closing the contact which is closed when the total opening of the front screen provided on the side of the camera body is completed, providing the delay signal member for controlling the delay means on the interchangeable lens so that when the lens is mounted on the camera body, the said delay signal member and the delay means on the body side, the shutter signal member and the shutter on the interchangeable lens can be fitted respectively, and the timing for closing the contact provided on the side of the camera body can be automatically adjusted into the time when the total opening of the lens shutter is completed by means of the delay signal member; releasing the lens shutter having been closed right before the signal of the shutter signal member is received, by receiving the signal to the result that strobo-flash photographing can be carried out by closing the X contact, and closing the lens shutter after the exposure by means of strobo-flash, closing the rear screen of the focal plane shutter as the lens shutter is closed.

Moreover, in accordance with this invention, strobo-flash photographing device is provided in a focal plane shutter camera to which the interchangeable lens having shutter can be attached, wherein the shutter signal member for transmitting the front screen opening completion timing of the focal plane shutter to the lens shutter is provided on the side of the camera body by interlocking to the front screen, and the electric circuits inclusive of both of the flash X contacts provided on the interchangeable lens side and the camera body side closed at the time when the total opening of the shutter is completed, are parallelly connected, and the control signal member for controlling the opening and closing of the flash contact on the side of the body, is provided on the interchangeable lens, and when the interchangeable lens is mounted on the camera body, the control signal member of the interchangeable lens side and the shutter are connected to the X contact fitting member and the shutter signal member of the camera body side respectively, and the lens shutter which is closed right before the signal of the shutter signal member is received, is opened by receiving the signal, and when X contact is closed, flash photographing can be carried out even when the flashgun is connected to any of the flash terminals on the side of the interchangeable lens or the camera body side, the lens shutter is closed after the exposure by means of the strobo-flash, and when the lens shutter is closed, the rear screen of the focal plane shutter can be closed.

In addition, in accordance with this invention a strobo-flash photographing device is provided in a single lens reflex camera having focal plane shutter, wherein the lens having shutter can be attached as one of the interchangeable lenses, the diaphragm of the lens which is made to be always open is interlocked to the shutter release on the side of the camera, and is connected to the automatic stopping device on the side of the camera to be stopped down to the preset stopping value, and the lens shutter which is always open can be simultaneously closed, and the closed lens shutter is connected to the signal member for catching the timing of completing front screen running of the focal plane shutter, and the lens shutter is opened again by said signal member, and the X contact is closed to the effect that stroboflash photographing can be carried out, and the lens shutter is closed after the exposure by means of strobo-flash, and when the lens shutter is closed, the rear screen of the focal plane shutter runs, and at the same time when the running of the rear screen is completed, the lens shutter is opened again, and the diaphragm of the lens shutter is again totally opened.

This invention will be described more clearly referring to the illustrative embodiments shown in the attached drawing, in which:

FIG. 8 is a graph showing the relations of operations of the respective mechanisms of this invention, and shows the case in which a single lens reflex camera and the lens having diaphragm and lens shutter are combined;

In the several views illustrating the present invention, the same reference characters designate the same or similar elements.

Figure 1:
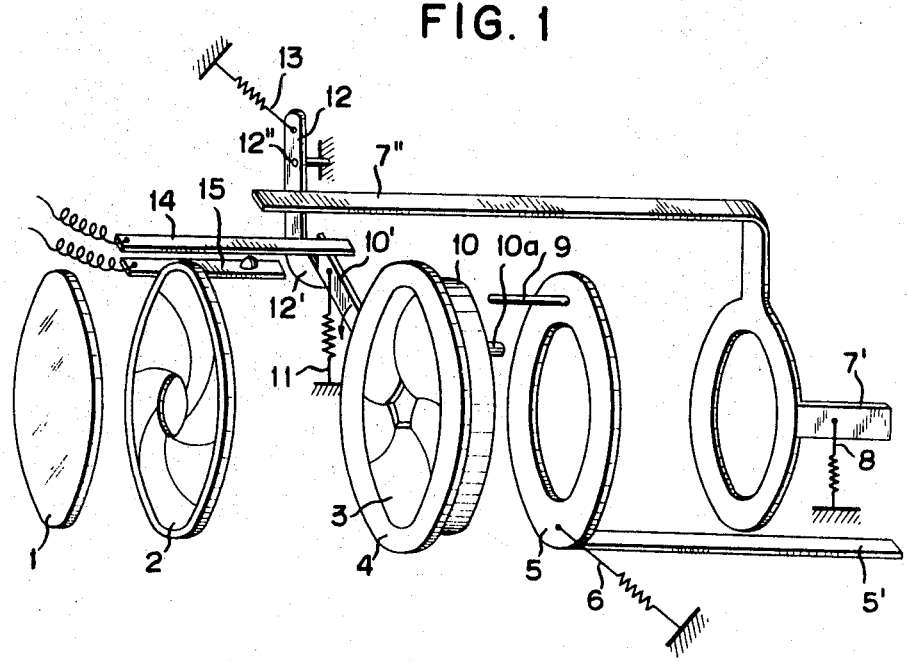
FIG. 1 is a perspective view of the main portion of a basic lens of an embodiment of this invention.
Figure 2:
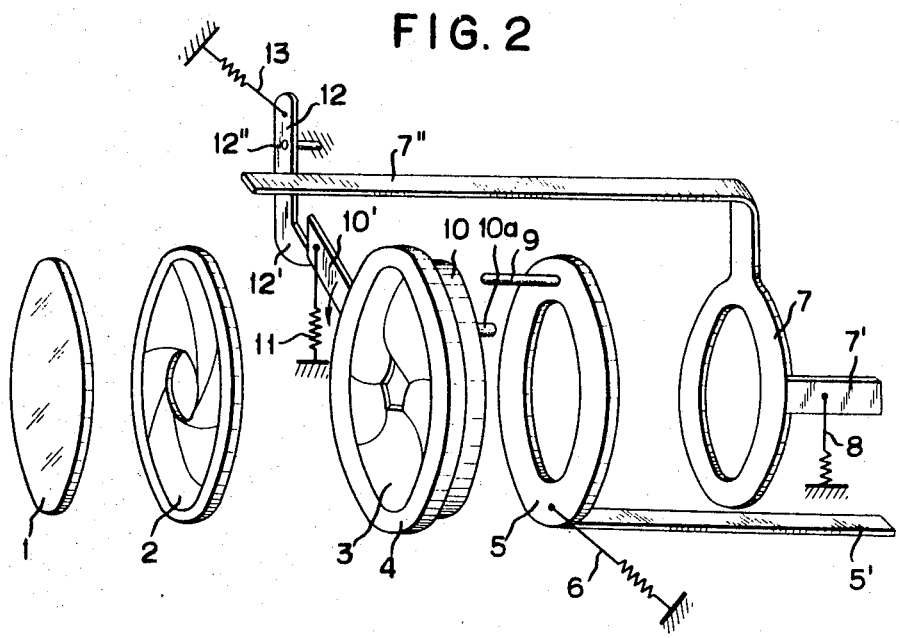
FIG. 2 is a perspective view as FIG. 1, but shows an embodiment in which X contact for flash is not provided in the lens shutter.
Figure 5:
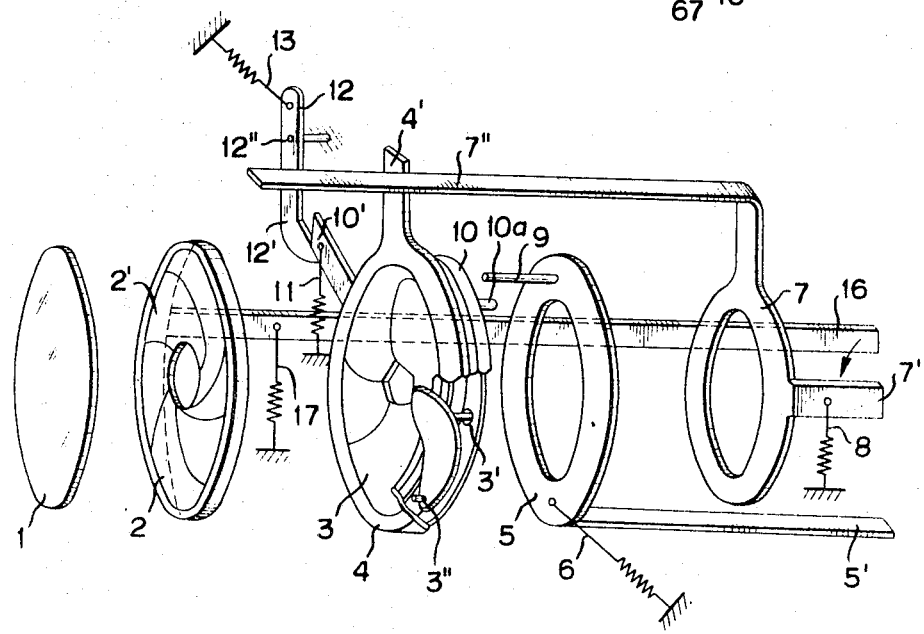
FIG. 5 is a perspective view of the main portion of the lens of another embodiment of this invention.

Referring now to FIGS. 1, 2 and 5 illustrating the lens portion of several embodiments, the reference numeral 1 designates a lens element of an interchangeable lens for a camera having a focal plane shutter as will hereinafter appear, the lens being provided with a diaphragm 2 and shutter blades 3. The shutter blades are provided with pins 3' and 3" (FIG. 5), the pins 3" being fixed in a ring 4. In one embodiment (FIG. 5) the ring is formed with an extending arm 4'. An interlocked shutter charging ring 5 coaxial with the ring 4 and formed with a longitudinally extending arm 5' is provided for charging the shutter blades 3 in preparation for an exposure.

Figure 4:
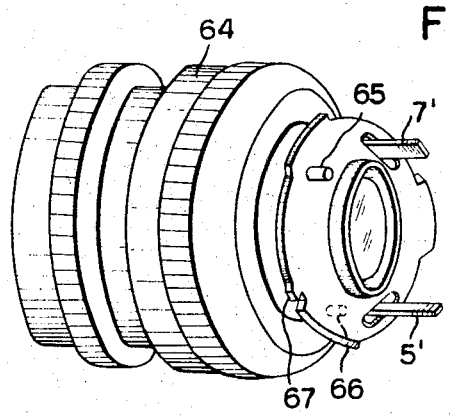
FIG. 4 shows the outline of the basic lens of this invention.
Figure 7:
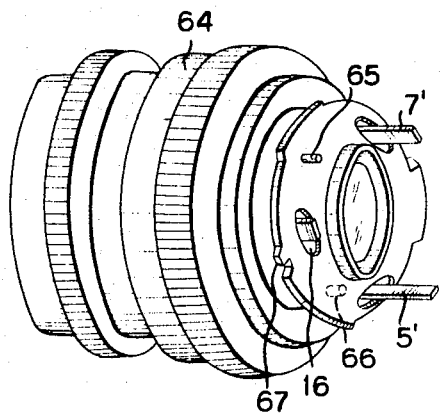
FIG. 7 shows the outline of the lens of FIG. 5.

A return spring 6 is provided for the ring 5 to return the ring to its initial position after an exposure. Coaxially with the shutter ring 5 is an interlocking shutter release ring 7 formed with a rearwardly projecting arm 7' and a forwardly projecting arm 7", a return spring 8 being provided to return the ring to its initial position. Secured in the forward face of charging ring 5 is a connecting rod or pin 9 which is adapted to abut a pin 10a provided on a coaxial ring member 10 for driving the shutter blades 3. The ring member 10 is formed with a projecting lever arm 10', the member 10 being returnable to its initial position by a spring 11 secured to the lever arm. A release pawl or latch 12 formed with a hooked end 12' and pivoted as at 12", engages the underside of the lever arm 10' due to the bias of a spring 13. In the embodiment of FIG. 1, the lever arm 10' cooperates with a pair of contacts 14, 15 hereinafter referred to as the X contacts provided in the lens for flash photography. In the embodiment of FIG. 5, a rearwardly projecting interlocking lever 16 is provided on the diaphragm adjusting ring 2' of the lens, a return spring 17 being provided for the lever. Referring to FIGS. 4 and 7, it will be noted that the rearwardly projecting arms 5' and 7' of the embodiments illustrated in FIGS. 1 and 2 and the arms 5', 7' and 16 illustrated in FIG. 5 extend beyond the mounting plates of the respective lenses 64 for insertion into the camera body.

Figure 3:
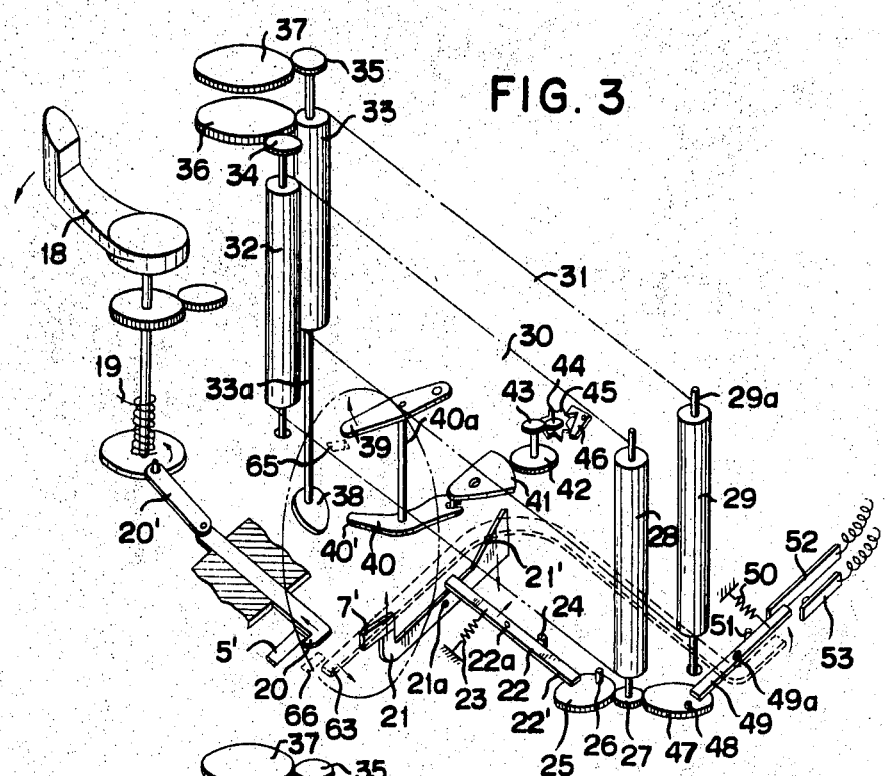
FIG. 3 is a perspective view of the main portion of a basic camera of an embodiment of this invention.
Figure 6:
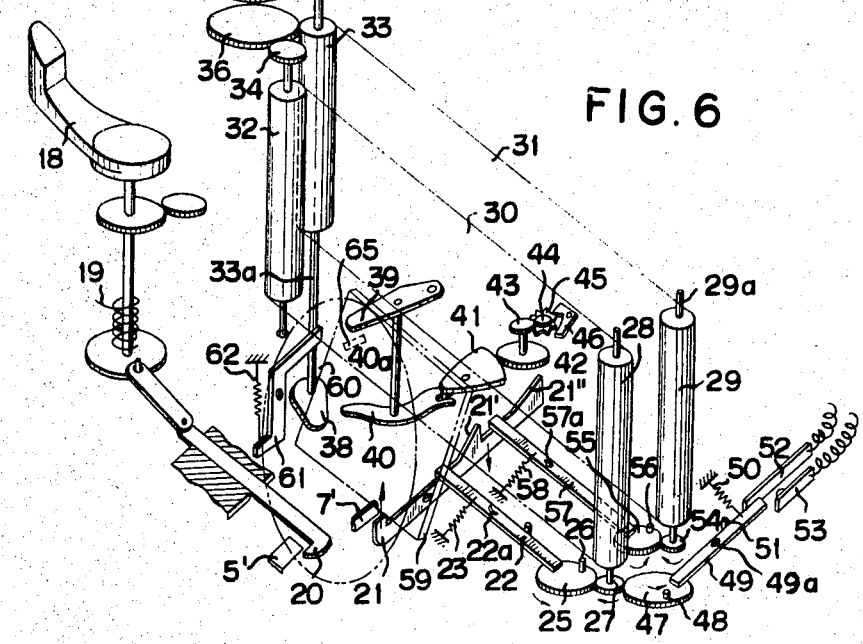
FIG. 6 is a perspective view of the main portion of the camera of the same embodiment as FIG. 5.
Figure 11:
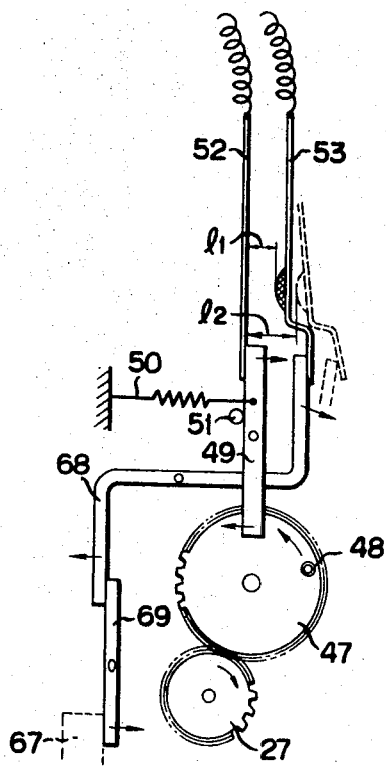
FIG. 11 is a diagram showing a part of the flash timing delaying device which is a part of the device of this invention.

Referring now to FIGS. 3, 6 and 11 of the drawings wherein those portions of the camera mechanism forming a part of the several embodiments of this invention are illustrated, a film advance and shutter charging lever 18 of the camera, not otherwise illustrated, and provided with the usual return spring 19, is connected to a pawl 20 through a link 20'. The pawl is movable longitudinally in the direction of the arrow upon rotation of the lever 18 in a counterclockwise direction to advance the film and charge the shutter, the pawl engaging the end of arm 5' of the lens shutter assembly. A release signal lever 21 pivoted in the camera body on a pivot 21a is adapted to abut the arm 7' of the release ring 7 of the lens assembly at one end, the other end of the lever being formed with a cam surface 21', as will hereinafter be described. Cooperating with the top edge of the release lever 21 is an intermediate lever 22 pivoted on a pin 22a in the camera body. A spring 23 tends to bias the lever 22 counterclockwise to abut a stop 24.

Cooperating with an end 22' of the intermediate lever is a gear 25 having fixed therein an upstanding pin 26, the end of the lever 22 extending into the arcuate path of the pin as the gear is rotated. The gear 25 meshes with a gear 27 provided on the front screen spring cylinder 28 of the camera shutter mechanism. The shutter mechanism further comprises a rear screen spring cylinder 29, a front curtain or screen 30, a rear curtain or screen 31, drums 32 and 33 being provided for the other ends of the respective curtains. Rotated with the respective drums are gears 34 and 35 meshing with gears 36 and 37, respectively.

Secured to the rear screen drum shaft 33a is a cam 38. As will hereinafter appear, a shutter time converting lever 39 cooperating with a pin 65 on the lens assembly is pivotally mounted in the camera and through a shaft 40a pivots a lever 40, the end 40' extending into the path of travel of the cam 38 on the rear screen drum shaft. The other end of the lever 40 is pivotally connected to a sector gear 41 which meshes with a gear 42. The gear 42 is integral with a gear 43 meshing with a gear 44 of an escapement mechanism formed by a star wheel 45 and an escapement pawl 46.

Meshing with gear 27 rotatable with the front screen spring cylinder is a gear 47 having secured thereon an upstanding pin 48. The pin 48 is adapted to abut a lever 49 pivoted as at 49a.

A spring 50 holds the lever 49 against a stop 51, the end of the lever cooperating with electrical contacts 52, 53 forming the X contacts of the camera.

In the embodiment illustrated in FIG. 6 the rear screen spring cylinder shaft 29a has secured thereto a gear 54 which meshes with a gear 55 having an extending pin 56 fixed in its top surface. Rotation of the gear 55 will cause the pin to strike one end of a lever 57 pivoted as at 57a and biased by a spring 58, the other end of the lever 57 cooperating with the top edge of the release signal lever 21 intermediate the cam surface 21' and a second cam surface 21" formed thereon which is slightly higher than the cam surface 21'.

Indicated in FIG. 6 by the dotted-dash lines is a reflecting or viewing mirror 59 for the camera which is pivoted upwardly in the usual manner when an exposure is made. Fixed to the mirror 59 is a pin 60. The mirror pin cooperates with a pivoted lever 61 which is biased in a clockwise direction by a spring 62, the lever 61 cooperating with the diaphragm extension arm 16 illustrated in FIG. 5 in the manner to be described.

In FIG. 3, a pivoted reverse S-shaped lever 63 is illustrated in dashed lines for actuating the X contacts 52,53 in the camera body when an interchangeable objective 64 having a lens shutter and X contacts is mounted on the camera body to disable the X contacts of the camera, as will hereinafter be more fully described.

Referring to FIGS. 4 and 7 of the drawings the objective lens 64 is provided with builtin shutters 3 as already described, the lens being provided with a mounting plate having the extending pin 65 previously mentioned for converting the camera shutter time. In addition, the objective 64 is provided with a pin 66 for interlocking with the lever 63 of the camera, and a radial projection or tooth 67 for displacing the contact engaging position of the X-contacts in the camera.

Referring to FIG. 11 of the drawings, a pivoted lever 69 within the camera is abutted and moved in the direction of the arrow by the projection 67 is pivot an S-shaped lever 68 clockwise. The end of the lever 68 abuts the end of the contact 53 to increase the spacing between the X contacts of the camera.

Figure 9:
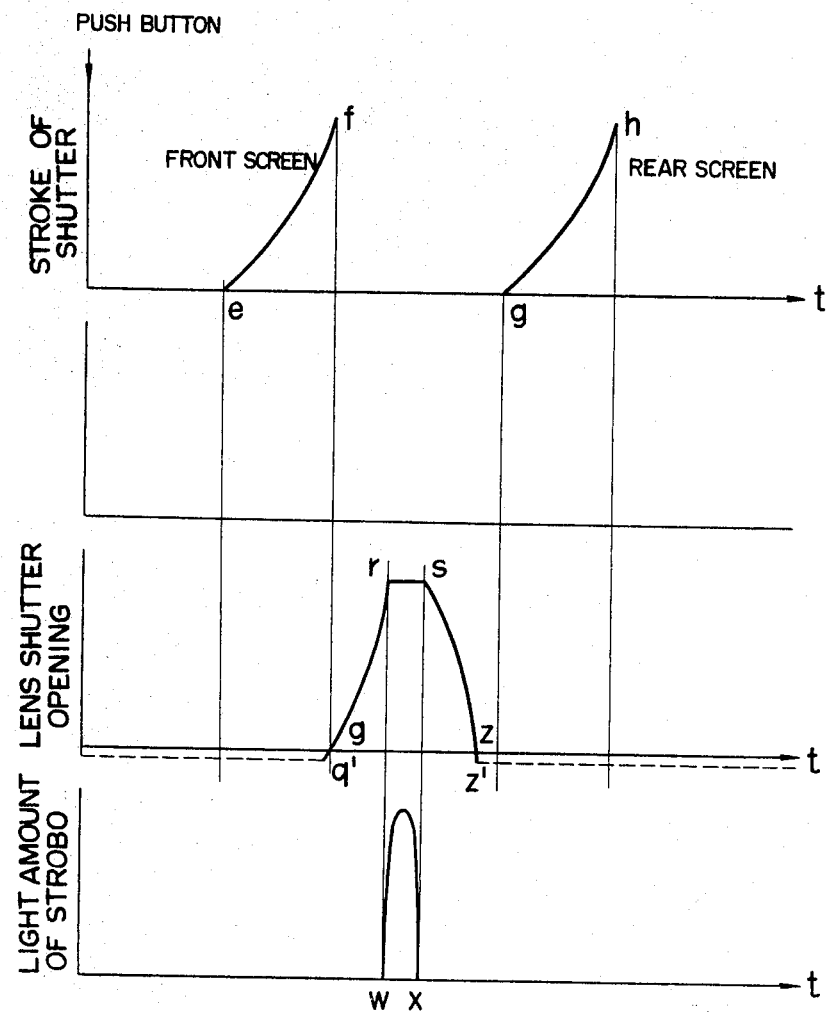
FIG. 9 shows the graph as FIG. 8, and shows the case of the embodiment shown in FIG. 1.
Figure 10:
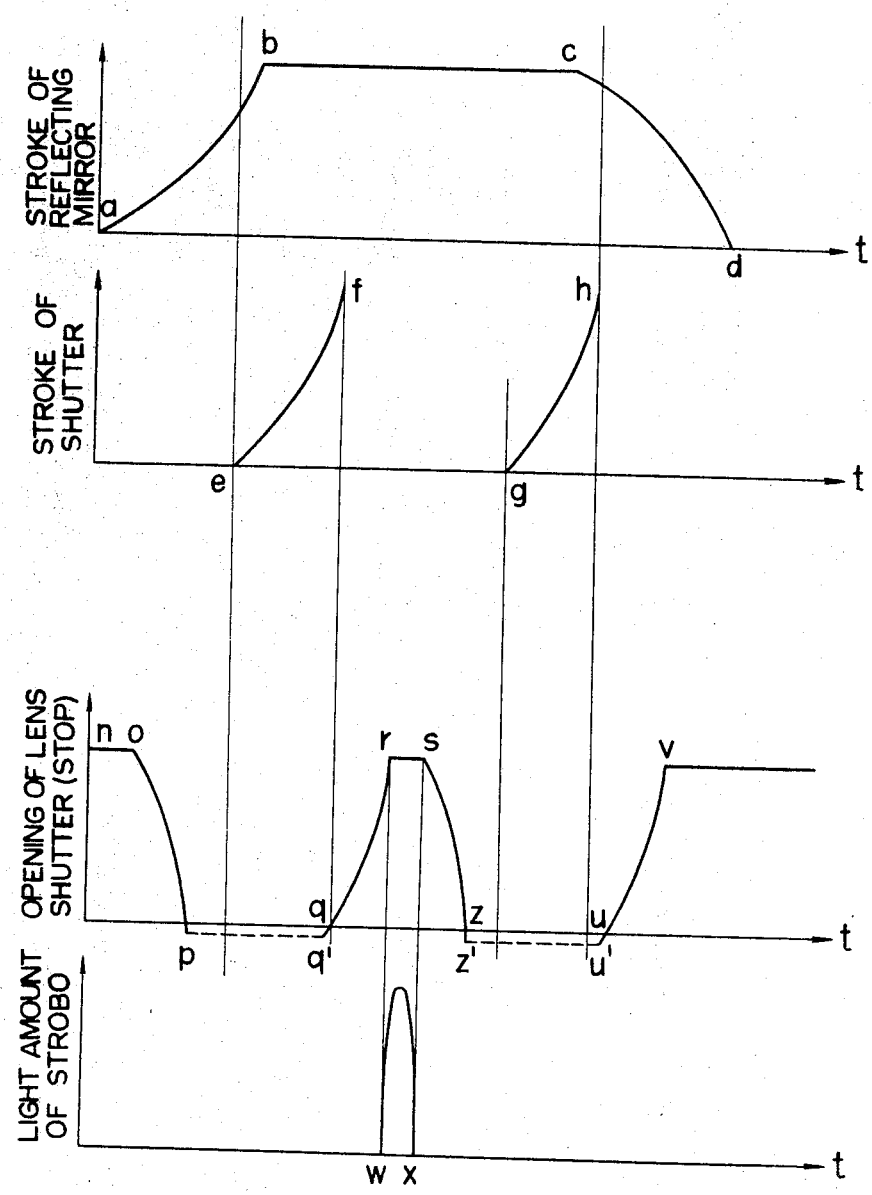
FIG. 10 is a similar graph as FIG. 8, but shows the case in which the diaphragm of the lens can play the role of the shutter blades of the lens shutter.

Referring to FIG. 8, 9 and 10, the curve $a-b$ is the reflecting mirror elevating curve; $c-d$ is the reflecting mirror lowering curve; $e-f$ is the front screen running curve; $g-h$ is the rear screen running curve; $i-j$ is the diaphragm open curve; $j-k$ is the stopping curve; $k-l$ is a predetermined stopping value; $l-m$ is the opening curve.

$n-o-p$ is the lens shutter opening; $p-p'-q'-q$ is the lens shutter closed; $q-r-s-z$ is the opening for a predetermined time; $z-z'-u'-u$ is the lens shutter closed; $u-v$ is opening. $w-x$ is strobo-flash illuminating curve. The abscissa stands for time $t$.

Figure 12:
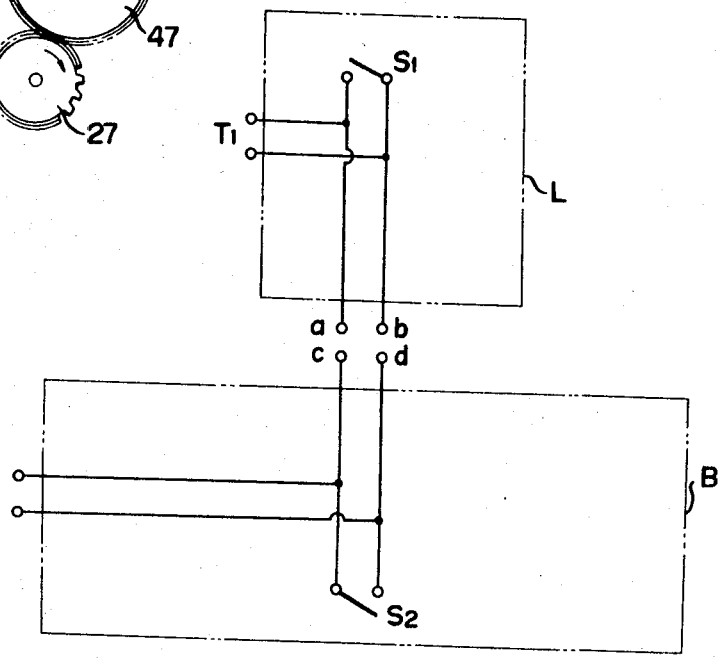
FIG. 12 is a diagram showing the circuit of this invention.

Referring to FIG. 12, $S_1$ is X contact of the lens; $T_1$ is the terminal for X contact of the lens; $S_2$ is X contact of the camera; $T_2$ is the terminal for X contact of the camera; $a$, $b$, $c$ and $d$ are the terminals to be connected by fitting the lens to the camera. The two dotted chain line portion L and B are respectively objective lens and camera body.

Referring to FIG. 3 and FIG. 6, the ellipse shown by the chain line, shows the objective lens fitting hole provided on the camera body.

The following is an explanation about the effect thereof.

Referring now to FIGS. 1, 2, 3 and 4, when the lens 64 of FIG. 4 is mounted on the camera body in the opening indicated by the dotted-dash line, the extending arm 5' engages the shutter charging pawl 20 in the camera, while the extending arm 7' engages the shutter release lever 21 in the camera. The time converting pin 65 of the lens abuts the end of the lever 39 in the camera body and rotates the lever clockwise in the direction of the arrow. The clockwise rotation of the lever 39 rotates the lever 40 to adjust the total opening time of the camera shutter through the interaction of the governor mechanism provided by the elements 41 through 46 coupled through lever 40 and cam 38 to the rear screen drum 33. When the film advance and shutter charging lever is rotated in the direction of the arrow, the charging pawl 20 moved in the direction of the arrow will rotate the shutter interlocking ring 5 thereby rotating the ring 10 through the abutment of the pins 9 and 10a. This will rotate the extending arm 10' to a position wherein the latch 12 catches and holds the arm to maintain the lens shutter charged after the lever 18 is returned to its initial position by the spring 19 thereby releasing the arm 5'.

When the shutter release button (not shown) on the camera is depressed, the rotation of the front screen cylinder gear 27 rotates the gear 26 so that upon completion of the movement of the front screen 30, the pin 26 on the gear 25 engages and pivots the lever 22 against the bias of the spring 23 to ride up upon the cam portion 21' to depress that end of the lever 21 in the direction of the arrow. This will lift the forward end of the lever to move the arm 7' upwardly causing rotation of the release ring 7 of the lens shutter assembly. The rotation of the ring 7 will move the arm 7'' against the latch 12 to release the arm 10'. The spring 11 will rotate the ring 10 in the direction of the arrow to open the lens shutter.

At the same time, the rotation of the front screen cylinder gear 27 rotates the gear 47 to abut the pin 48 thereon against X contact lever 49 in the camera to close the contacts 52,53 to complete the flash circuit. Thereafter the lens shutter is closed after a predetermined time and the rear screen 31 is released through the governor mechanism.

It is possible to provide an appropriate delay so that the flash circuit over the X contacts 52,53 is closed at an instant when the lens shutter is open. Referring to FIG. 11, the lever 68 is abutted by one end of the lever 69 as previously described. The other end of the lever 69 is adapted to be engaged by the projection or tooth 67 provided on the objective lens 64 and rotated counterclockwise in the direction of the arrow. The lever 68 is thus pivoted clockwise in the direction of the arrow to increase the spacing $l_1$ between the contacts to an appropriate spacing $l_2$. The increased spacing between the contacts in the camera will provide a time delay in the closing of the contacts upon pivoting of lever 49 by front screen cylinder gear 27.

When X contacts 14 and 15 are provided on the objective lens as illustrated in FIG. 1, should the X contacts 52 and 53 of the camera close before the X contacts provided on the lens, it is not possible to obtain a synchronized flash. To this end, the lever 63 in FIG. 3 is provided for abutment at one end by the pin 66 provided on the lens when the lens is mounted on the camera. The abutment by the pin 66 will pivot the lever 63 counterclockwise in the direction of the arrow so that the other end of the lever holds the contacts 52,53 open even when the intermediate lever 49 is abutted by the pin 48 on gear 47.

In the case of a single lens reflex camera having a focal plane shutter it is necessary to maintain the lens shutter open to provide a bright scene in the view finder. In FIGS. 5, 6 and 7 of the drawings the lens 64 is provided with an automatic stop mechanism for stopping down the diaphragm only upon shutter release. The rearwardly extending stop arm 16 on the diaphragm adjusting ring 2' engages the stop lever 61 in the camera. When the shutter release button is depressed, the reflecting mirror 59 is elevated by the mirror mechanism of the camera (not shown) and the pin 60 on the mirror abuts the rearwardly extending end of the lever 61 so that the arm 16 no longer abuts the lever. This permits the spring 17 of the stop arm to move the diaphragm ring 2' to a predetermined stop setting. With the depression of the release button, the front screen cylinder gear will be rotated in the manner described to lift the release arm 7' on the shutter release ring 7 in the lens.

Arm 7'' of the release ring pivots the pawl 12 to free the arm 10' to permit spring 11 to close the lens shutter, the lens shutter opening again. With the lens shutter open, the X contacts 52,53 in the camera are closed by the action of the front screen cylinder gear 27 turning the contact lever actuating gear 48 to complete the flash circuit. The lens shutter closes after a predetermined time. The governor controlled rear screen of the camera moves to complete the flash exposure. The rear screen cylinder gear 54 rotates the gear 55 to pivot the lever 57 which then rides up on the second cam surface 21'' formed on the lever 21. The lever 21 is again depressed a little more than before to lift the arm 7' on ring 7. The arm 7'' engages the arm 4' to rotate ring 4 to release the closed shutter. The stop lever 61 in the camera is then moved to its initial position by the spring 62 when the viewing mirror 59 is again lowered. Thus the diaphragm is again held open. The scene as viewed in the viewfinder is again brightly illuminated.

This invention can be used in such a structure that the diaphragm of the lens can play the role of the shutter blades of the lens shutter, and FIG. 10 shows the operations of the respective portions when this invention is used in the structure where the diaphragm of the lens plays the role of the shutter blades of the lens shutter. In the explanation of the embodiment, the structure wherein the diaphragm and the lens shutter can be again opened after the completion of the operation of the focal plane shutter, is explained, but this invention can be used in such a structure that the diaphragm (or shutter) is not automatically opened again, and it is opened when the film and shutter winding is completed, and at the same time this invention can be used not only in such a structure that the lens shutter is provided between the lens but also in a structure that the lens shutter is provided in front of or at the back of the lens.

We claim:

1. An electronic flash photographing device for a camera comprising an interchangeable objective having a lens shutter, a releasing member and shutter charging means for said lens shutter, a focal plane shutter for the camera having first and second curtains for opening and closing the film aperture of the camera, an X contact for closing an electric circuit for flash photography in cooperation with said first curtain at its full opening, shutter speed adjusting means for the focal plane shutter for setting the starting time interval between said first and second curtains, including means for delaying the start of said second curtain time converting means fixed on said objective and coupled with said delay means in the camera body when the objective is mounted on said camera body, a shutter charging device on the camera body coupled with said focal plane shutter and said lens shutter charging means for charging thereof, and a transmitting member engageable by said releasing member of the objective when the objective is mounted on said camera body for transmitting to said releasing member a signal representing the completion of the opening of said first curtain.

2. An electronic flash photographing device for a camera according to claim 1, which further comprises X contact delay means provided in the focal plane shutter for delaying the time of closing X contact, and X contact delay signal means fixed on the objective, and coupled with said X contact delay means when the objective is mounted on said camera body.

3. An electronic flash photographing device for a single lens reflex camera having a reflecting mirror comprising an interchangeable objective having a lens shutter, a releasing member and shutter charging means for said lens shutter, a focal plane shutter having first and second curtains for opening and closing the film aperture of the camera, an X contact for closing an electric circuit for flash photography in cooperation with said first curtain at its full opening, and an automatic preset stop interlocked with the elevating operation of said reflecting mirror, shutter speed adjusting means for the focal plane shutter for setting the starting time interval between said first and second curtains including means for delaying the start of said second curtain, a first means for opening and closing the shutter blades of the lens shutter in cooperation with said shutter charging means for the lens shutter and a second means operated independently of said first means for opening and closing the shutter blades and coupled with said automatic preset stop to actuate the second means to its closing position when the mirror elevates and to its opened position after the completion of the closure of the second curtain, time converting means fixed on said objective and coupled with said delay means in the camera body when the objective is mounted on said camera body, a shutter charging device on the camera body coupled with said focal plane shutter and said lens shutter charging means for charging said shutters, release signal member engageable by said release member for the lens shutter, a first transmitting member engaging said release signal member for transmitting a signal representing the completion of the opening of said first curtain, a second transmitting member engaging said release signal member for transmitting a signal upon completion of the closure of the second curtain, the release signal member being coupled with the lens shutter releasing member when the objective is mounted on said camera body.

4. An electronic flash photographing device for a camera having a a focal plane shutter with first and second curtains for opening and closing the film aperture of the camera, and X contacts operable to close a flash circuit upon completion of the movement of the first curtain of the focal plane shutter, comprising an interchangeable objective having a lens shutter, a releasing member and shutter charging means for said lens shutter, and an X contact for closing the flash circuit when the lens shutter is fully opened, shutter speed adjusting means for the focal plane shutter for setting the starting time interval between said first and second curtains, including means for delaying the start of said second curtain means for disabling the actuation of X contact in the camera including X contact signal means fixed on said objective and coupled with said X contact disabling means in the camera when the objective is mounted on said camera, a shutter charging device on the camera body coupled with said focal plane shutter and said lens shutter charging means for charging thereof, and a transmitting member engageable with said releasing member of the objective when the objective is mounted for transmitting to said releasing member a signal representing the completion of the opening of said first curtain, 5. An electronic flash photographing device for a camera according to claim 4, which further comprises two pairs of terminals provided on the objective, the terminals in each pair being connected in parallel to said X contact in the lens shutter, and two pairs of terminals provided on the camera body, the terminals in each pair being connected in parallel to said X contact in the camera body, whereby one pair of the terminals in the objective is connected to one of the terminals in the camera body when the objective is mounted thereon.

6. An electronic flash photographing device for a camera having a focal plane shutter including first and second curtain advancing mechanisms, comprising an interchangeable lens having a shutter, a shutter charging ring, and a shutter releasing ring, both rings having extending signal members for insertion into the camera body when the lens is mounted on the camera body, means for charging the focal plane shutter of the camera including an interlock with the lens charging signal member for charging the lens shutter, normally open X contacts in the camera body, means operable by the first curtain advancing mechanism of the camera shutter upon release thereof for moving the releasing signal member after the first curtain opens the camera aperture for releasing the lens shutter, and a contact actuator operable by the first curtain advancing mechanism to close the X contacts before the second curtain closes the camera aperture.

7. An electronic flash photographing device according to claim 6, wherein the interchangeable lens is provided with normally open X contacts, a disabling signal member on said lens for insertion into the camera body, a disabling member in the camera and engaged by the disabling signal member of the mounted lens and moved thereby to maintain the X contacts in the camera open, and means for closing the X contacts of the lens upon release of the lens shutter by the shutter releasing signal member.

8. An electronic flash photographing device according to claim 6, wherein the interchangeable lens is provided with a diaphragm and an automatic stop mechanism therefor, the diaphragm ring having an extending signal member for insertion into the camera body, and the camera is a single reflex camera having a viewing mirror; and interlocking member within the camera body engaged by the diaphragm signal member to hold the lens diaphragm open during charging of the shutters, an abutment on the viewing mirror engaging the interlocking member when the viewing mirror is elevated to release the diaphragm signal member permitting the diaphragm to close to its present aperture, and means operable by the second curtain advancing mechanism to move the releasing signal member an additional amount for releasing the closed lens shutter.

9. An electronic flash photographing device according to claim 6, wherein the interchangeable lens is provided with a signal projection for insertion into the camera body, an intermediate interlocking member in said camera movable by said signal projection, a movable member in said camera and coacting with one of the X contacts in the camera, said movable member being moved by the intermediate member to increase the spacing between the X contacts to provide a time delay for the closing of the contacts.